Aug. 19, 1952 P. H. BISCOE 2,607,225
LIQUID LEVEL GAUGE
Filed Jan. 23, 1948 2 SHEETS—SHEET 1
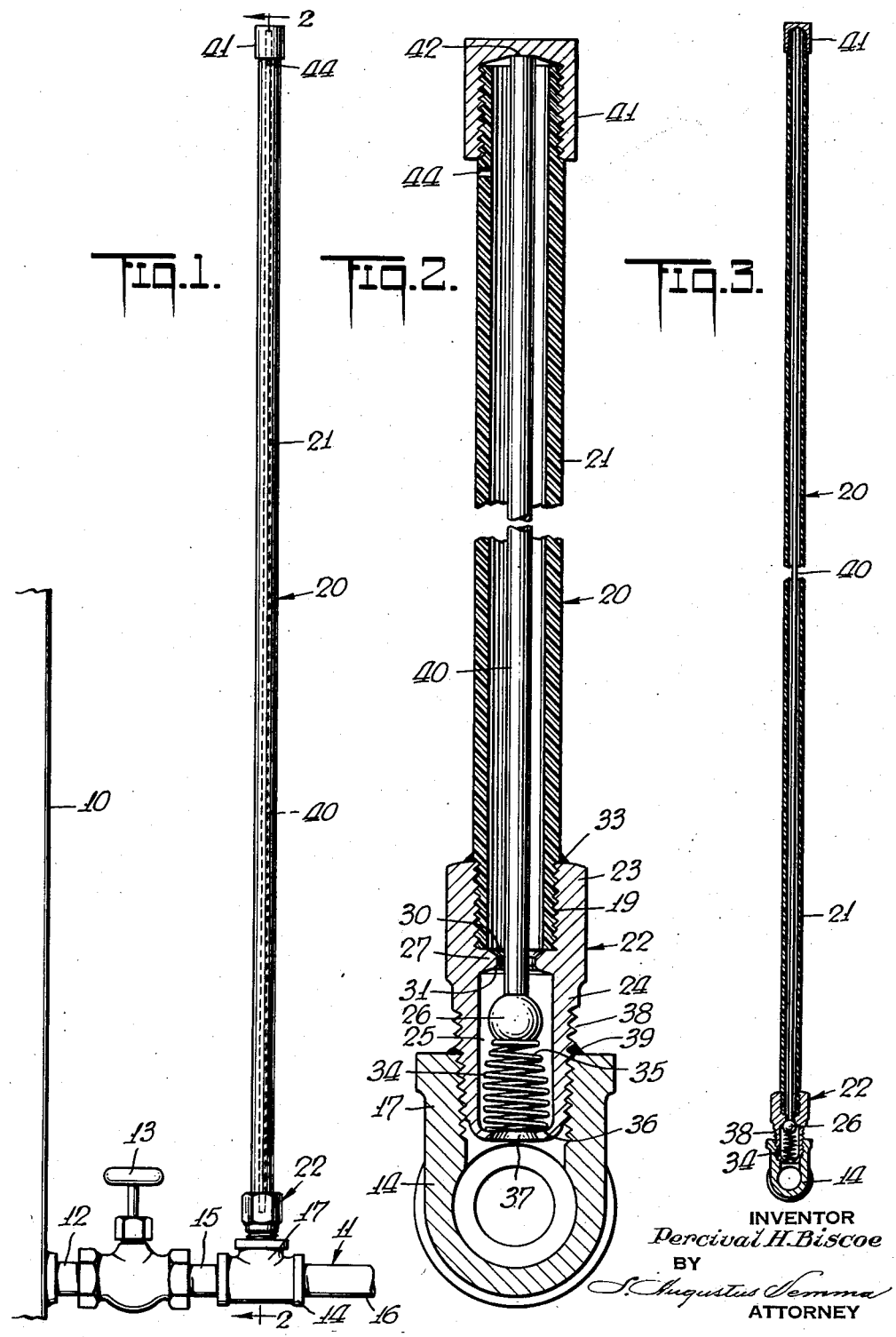
INVENTOR
Percival H. Biscoe
BY
S. Augustus Semma
ATTORNEY

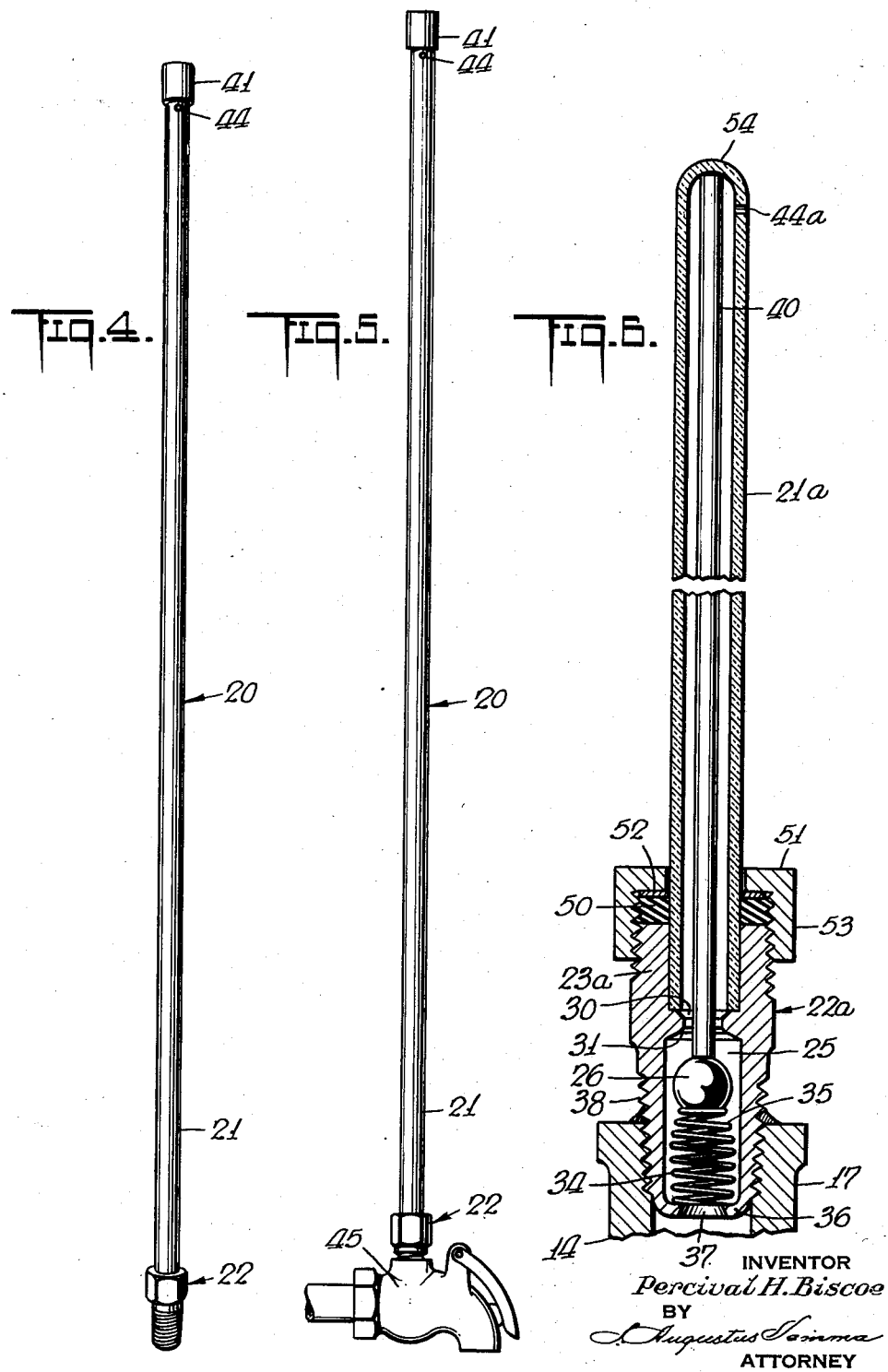

Patented Aug. 19, 1952

2,607,225

UNITED STATES PATENT OFFICE 2,607,225

LIQUID LEVEL GAUGE

Percival H. Biscoe, Jacksonville, Fla., assignor to Saf-T-Visi Gauge Corporation, a corporation of Florida Application January 23, 1948, Serial No. 3,977

3 Claims. (Cl. 73—323)

1

The present application relates to the subject matter of copending applications Serial No. 714,964, filed December 9, 1946, now abandoned, and Serial No. 761,487, filed July 17, 1947, and pertains to an invention relating to liquid level indicators or gauges of the sight tube type.

The ordinary liquid gauge of the type referred to for measuring the height of liquid in a vessel under substantially atmospheric pressure, such as that employed in connection with a fuel oil tank, comprises generally a vertically mounted transparent frangible sight tube sealed or packed into a pipe fitting connected to said vessel below the level of the liquid therein. Upon accidental breakage of this sight tube, the liquid from the vessel will escape through the fractured tube before the matter has been attended to, as, for example, by the closing of a hand valve in the pipe fitting.

Furthermore, in such conventional liquid gauges, the sight tube must be packed or sealed during the operation of installing the gauge in position, so that this tube may be fractured by the installer during such operation, as a result of the application of excessive packing or sealing pressure.

One object of the present invention is to provide a new and improved liquid gauge having a safety valve which closes automatically by positive action upon fracture of the sight tube and which thereby prevents the escape of liquid from the vessel through said tube.

Another object is to provide a new and improved safety liquid gauge of the self-closing character above referred to, which has valve floating features assuring the proper seating of the valve member in closed position, which is positive in its closing action, which is inexpensive of construction and reliable in operation, which is of unit assembly construction with its sight tube prepacked or presealed in position into a safety valve fitting, so that the possibility of applying destructive sealing or packing pressure to the sight tube during the mounting of the gauge is avoided, which can be easily applied to existing gauge mounting installations with minimum of pipe fitting operations, which can be quickly, easily and expeditiously removed from its pipeline mounting, which is constructed to minimize the clogging and the collection of dirt and grease around the safety valve seat during normal operations, so that effective, automatic and tight closing of the safety valve is assured when circumstances require it and which lends itself to quick and effective cleaning with minimum of manipulation when removed from its mounting.

2

Various other objects of the invention will be apparent from the following description and by the inspection of the accompanying drawings, in which—

Fig. 1 is a side elevation of a form of safety liquid gauge embodying the present invention and shown in installed operative position with respect to a pipeline or connection leading from the lower section of a tank or vessel;

Fig. 2 is a longitudinal section of the safety liquid gauge of Fig. 1 taken along lines 2—2 of Fig. 1 but on a larger scale and shows said gauge in operative position before fracture of the sight tube and while the valve member is forced off its seat, to maintain communication between the vessel or tank whose liquid level is being measured and the interior of said sight tube;

Fig. 3 is a longitudinal section of the safety liquid gauge taken along the lines 2—2 of Fig. 1 and shows said gauge after the sight tube has been fractured accidentally and the safety valve automatically closed to block communication with the pipeline or connection leading from the tank or vessel;

Fig. 4 is a perspective of the liquid gauge per se shown as a self-contained unit prior to its being mounted into operative position into a pipeline or connection;

Fig. 5 is a side elevation of the liquid gauge unit similar to that of Fig. 1 but shown mounted into a spigot connected to a drum or tank; and Fig. 6 is a longitudinal section of another form of liquid safety gauge embodying the present invention and shown in intact operative condition.

Referring to Figs. 1 to 4 of the drawings, there is shown a conventional tank, vessel, drum or receptacle 10 maintained under substantially atmospheric pressure and adapted to hold the liquid whose level is to be measured by the gauge of the present invention. This tank 10 may serve for any suitable purpose where a liquid container is required, as for example, as a liquid fuel tank and has a pipeline or connection 11 from its lower section leading to a distant point where the liquid is to be used, treated or consumed. For example, this connection 11 may lead to a burner or stove in the case where the vessel 10 serves as a liquid fuel tank and may constitute as shown a pipe 12 screwed into said tank, a hand valve 13 shown as a standard globe valve screwed to said pipe 12, a T-fitting 14 having its axial inlet branch connected into the outlet side of said hand valve through a pipe-nipple 15 and its axial outlet branch screwed into a pipe 16 leading to a remote point as indicated.

The tank installation with its pipe connection so far described is of the conventional type and is commonly employed to mount the ordinary liquid gauge into the lateral branch or outlet 17 of the T-fitting 14.

The liquid level gauge unit 20 of the present invention shown in Figs. 1 to 4 comprises a frangible transparent sight tube 21, which as far as certain aspects of the invention are concerned, may be of any material suitable for the purpose, but which in the specific form shown is of plastic material of a type which lends itself readily to pipe threading. The lower end of this sight tube 21 has an external pipe thread 19 and is screwed into the outlet end of a unitary or one-piece tubular valve fitting 22 having its inlet end constructed for connection to the pipeline or connection 11. This fitting 22 is made of any suitable metal, such as brass or stainless steel and has an upper cup-like internally pipe-threaded section 23 for sealably receiving the lower end of the sight tube 21 and a lower valve casing section 24 defining a valve chamber 25 for a movable spring loaded safety valve member 26. A transverse wall 27 between the two fitting sections 23 and 24 defines a stop shoulder for the lower end of the sight tube 21 and is apertured to form a valve passage or port 30 between the valve chamber 25 and the interior of the said sight tube. The lower edge of this transverse wall 27 is desirably lapped or otherwise machined to form an annular valve seat 31 of small depth conforming in transverse curvature to that of the valve member 26.

The lower end of the sight tube 21 is screwed into the upper cup-like fitting section 23 and is sealed therein by means of a thread filler 33 such as that ordinarily employed for sealing threaded pipe joints. This filler while in plastic condition is applied to the threads of the sight tube 21 before said tube is screwed into the fitting 22 and solidifies to form a firm water-tight joint.

The valve member 26 is desirably in the form of a spherical ball and is urged towards closure position against its valve seat 31 by means of a coil spring 34 in the valve chamber 25. This coil spring 34 has its upper section 35 tapered to prevent it from telescoping into its lower section and reduced in pitch to form a substantially horizontal end convolution on which the ball can firmly rest without being cocked. The lower end of this coil spring 34 rests on an outer tranverse end wall 36 provided with an aperture 37 to maintain communication between the main passage of the T-fitting 14 and the valve chamber 25.

The lower section of the valve fitting 22 is provided externally with a pipe thread 38 for connection into the lateral branch or outlet 17 of the T-fitting 14 and may be sealed therein by a suitable sealing composition 39 similar to that employed to seal the sight tube 21 into the valve fitting 22.

The valve fitting 22 is built to retain permanently the ball valve member 26 and the coil spring 34 therein and to form therewith a self-contained unit. To that end, the fitting 22 is constructed from solid stock which is bored from both ends to form the upper cup section 23 and the lower valve casing section 24 and to define a solid transverse wall between said sections. This transverse wall is then drilled or apertured and lapped or machined to form the transverse ported wall 27 with its valve seat 31. The valve fitting at this stage of manufacture will have a lower lip or skirt constituting an axial extension of the peripheral wall of said fitting. The ball valve member 26 and the spring 34 are then inserted into the fitting through the lower open end thereof and the end lip forged or crimped inwardly by a suitable die forging tool to form the aperture end wall 36 of the fitting 22 and to retain said valve elements 26, 34 permanently in said fitting.

The valve member 26 is urged towards the valve seat 31 by the coil spring 34 but is normally crowded out of contact with said valve seat and into open position by means of a column member 40 extending between said valve member and the upper end of the sight tube 21. This column member 40 is desirably so constructed as to be rigid or unyieldable when subjected to endwise compressive forces encountered in the operation of the gauge and is preferably in the simple form of a straight cylindrical rod, as shown, although as far as certain aspects of the invention are concerned, it may be in the form of a collapsible column maintained against collapse by the sight tube 21 in intact condition. For example, as far as certain aspects of the invention are concerned, the column member 40 may take the form of a plurality of balls, as shown and described in the aforesaid copending application Serial No. 761,487.

To provide a bearing surface for the upper end of the rod 40, there is threaded on to the upper end of the sight tube 21 a cap 41, desirably of metal. This cap 41 desirably has its end wall internally tapered or chamfered to define a bearing surface 42 at its central deepest part for the upper end of the rod 40. This chamfering may be formed by the very drilling or boring tool employed to hollow out the stock block from which the cap 41 is produced and the resulting taper serves to maintain the rod 40 in central position with respect to the sight tube 21 and with respect to the valve passage or port 30 through which it passes.

The rod 40 is long enough so that it extends between the cap 41 and the valve member 26 in off-seated position of said valve member and is small enough in diameter to pass through the valve passage or port 30 with enough clearance to afford free communication between the valve chamber 25 and the interior of the sight tube 21 through said passage.

This rod 40 bears at its lower end against the valve member 26 to crowd said valve member off its seat 31, and is desirably concaved at this lower end in conformance with the spherical curvature of said valve member to form a seat for said valve member and to avoid thereby lateral displacement of said rod relative to said valve member during normal conditions.

The rod 40 is in floating relationship to the valve member 26 and the cap 41. That is, the rod 40 is free or loose from attachment at its ends to the valve member 26 and the cap 41. This rod floating feature permits inexpensive construction, permits easy assembly and permits the cap 41 to be screwed into place with minimum turning of the rod 40, and therefore with minimum scarring of the surface of the valve member 26. Furthermore, this floating rod feature has the important advantage of permitting the valve member 26 to self-align itself into proper seating position, without the confining influence of the rod 40, upon breakage of the sight tube 21.

The rod 40 may have graduations clearly visible through the transparent sight tube 21 to indicate liquid level and serves not only to maintain the valve member 26 normally away from its seat 31 in open position but has the effect of rendering the liquid surface in said sight tube more visible by the refractive effect created on the liquid immersed part of said rod.

The sight tube 21 has a vent hole 44 below the cap 41 to maintain the interior of said tube under substantially atmospheric pressure. If the tank 10 contains a liquid whose vapors should not be made to escape into the atmosphere for some reason or other, the vent hole 44 may be connected to the vapor space of said tank by a capillary tube of desirably flexible or yieldable characteristics.

In assembling the gauge at the factory, after the sight tube 21 has been screwed and sealed into the completed valve enclosing fitting 22, the rod 40 is inserted into said tube through the upper open end thereof. At this stage of assembly, the valve member 26 will be pressed against its seat 31 by the spring 34 and the upper end of said rod will project outwardly beyond the upper open end of the sight tube 21. The cap 41 is then screwed on to the upper end of the sight tube 21. This operation will force the rod 40 endwise against the valve member 26 and will move said valve member off its seat 31 in open position as shown in Fig. 2. The gauge so assembled at the factory into a self-contained unit as shown in Fig. 4 may be stored and shipped as such and is ready for mounting into a pipeline or connection leading from any tank or vessel whose liquid level is to be measured.

Since the sight tube 21 has been presealed into the fitting 22 at the factory by expert hands and has been presumably factory inspected for possible fractures, there is no necessity for applying sealing or packing pressure to said sight tube when the gauge is installed into operative position, so that the possibility of breaking said sight tube by the application of destructive screwing or packing pressure during such installation is avoided.

The gauge unit 20 shown in Fig. 4 may be installed in position in an existing conventional pipeline such as that shown in Fig. 1, by merely screwing the lower section of the fitting 22 with the sight tube sealably attached into the lateral branch outlet 17 of the T-fitting 14, while the hand valve 13 is closed. The arrangement of the gauge mounting thread 38 about and concentric with the longitudinal axis of the gauge unit 20 permits this easy mounting of the gauge in operative position.

Upon the opening of the hand valve 13, the gauge unit 20 will be ready for immediate operation. The liquid from the tank will then flow past the open valve 13 and into the sight tube 21 until it reaches the level of the liquid in said tank 10.

In case the sight tube 21 should be fractured or broken while in operation, as shown in Fig. 3, the cap 41 will no longer bear down on the rod 40, so that the spring 34 will immediately push the valve 26 into closed position against the valve seat 31. The flow of liquid through the valve passage 30 is thereby checked as shown in Fig. 3, so that escape of liquid from the tank 10 through the fractured tube 21 is prevented. The hand wheel 13 can then be closed and the broken gauge unit easily replaced by a new one.

Since the valve seat 31 is intended to cooperate with the ball valve member 26, it may be of small area so that in operation it does not lend itself so readily to the adherence and accumulation of dirt thereon. The valve is therefore not apt to become clogged in operation or its valve seat 31 to collect sufficient dirt or grease thereon to interfere with effective closing of the valve when the sight tube 21 is accidentally broken. Moreover, even if dirt or grease should collect on the valve seat 31, the spring 34 will, nevertheless, push the ball 26 effectively against said valve seat into firm closed position. Because of the small area presented by the valve seat 31, the pressure per unit area exerted by the spring 34 against said seat upon breakage of the sight tube will be comparatively high and will therefore assure effective closing of the valve, in spite of any accumulation of dirt or grease on said valve seat.

If it is desired to clean the safety valve part of the gauge unit 20 after a period of use, all that is necessary is to unscrew the gauge unit from the T-fitting 14, dip the valve fitting 22 into a body of water or cleansing liquid and agitate the fitting therein.

The gauge unit 20 as shown in Fig. 4 may be installed into a pipeline such as that shown in Figs. 1 to 3 or may be installed into a spigot 45 connected to a drum as shown in Fig. 5. The casing of the spigot 45 may be provided at its top, ahead of its valve plug with a tapped hole into which the valve fitting 22 of the gauge unit 20 may be screwed in the installation of said gauge unit. Provision for this tapped hole may be made in the manufacture of the spigot, as shown, or if it is desired to install the gauge unit in an existing spigot line installation containing no provision for mounting such a gauge unit, the spigot may be tapped in situ to receive the gauge unit.

The installation of the gauge unit 20 may be made even in cases where the pipeline leading from a tank or vessel does not have any provision for mounting such a gauge unit. The only requirement necessary to provide for the installation of such a gauge unit is to drill and tap a hole in the pipeline.

In the construction of Figs. 1 to 5, the sight tube 21 has been shown of plastic material of the type which lends itself to threading, so that the lower end may be screwed into the valve fitting 22 and the upper end screwed into the cap 41. However, if the sight tube 21 is made of glass, it cannot be easily threaded, so that other provisions must be made to seal the lower end of the sight tube into the valve fitting 22 and to close the upper end of said sight tube. To that end, the lower unthreaded end of the glass sight tube 21a, as shown in Fig. 6, may be sealed into the valve fitting 22a by means of a stuffing box comprising a packing ring 50 of rubber or similar sealing material, embracing said lower tube end and seated on the upper end of the upper cup-like section 23a of said fitting. A gland or compression nut 51 is screwed over said cup-like fitting section 23a and bears through a washer 52 against the packing ring 50 to attach sealably the sight tube to the valve fitting 22a.

The stuffing box may be of the external type, as shown, with the gland 51 provided with an annular flange 53 internally threaded and screwed over the external thread of the cup-like fitting section 23a or may be of the internal type wherein the bore of the upper cup-like section of the valve fitting is larger than the external diameter of the sight tube 21a and the packing ring embracing said sight tube is contained snugly in said section. Such a cup-like section would be internally threaded and a gland in the form of an apertured externally threaded disc would be screwed into the interior of said cup-like section against the packing ring. The gland disc might have a pair of diametrically located slots for receiving a turning tool, such as a spanner wrench.

The upper end of the glass sight tube 21a may be closed by a closure 54 constituting an end wall integral with the side walls thereof and desirably domed or bevelled, as shown, to afford the necessary taper to center the rod 40 in said tube and may be vented through an opening 44a.

The fitting 22a with its permanently enclosed spring-loaded valve is similar in all respects to the fitting 22 described in connection with the form of the invention in Figs. 1 to 5, except for the provisions by which the lower unscrewed end of the sight tube 21a may be packed and sealed therein. The operation of the form of gauge unit shown in Fig. 6 is exactly the same as that already indicated in connection with the form of the invention shown in Figs. 1 to 5.

While the invention has been described with particular reference to specific embodiments, it is to be understood that it is not to be limited thereto but is to be construed broadly and restricted solely by the scope of the appended claims.

What is claimed is:

1. In a liquid level gauge, a sight tube, and an automatic safety valve secured to one end of said tube for controlling communication with the interior of said tube through said end and forming a self-contained unit with said tube, said device comprising a unitary fitting having at one end a cup section sealably receiving one end of said sight tube, and having at its other end a tubular valve casing section coaxial with said cup section, said fitting having a transverse wall between its sections integral with said sections and apertured to form a valve passage, said transverse wall defining a seat on its valve casing side, means forming an outer transverse apertured end wall for said valve casing section, a ball valve member in said casing section, a coil spring in said casing section bearing against said outer end wall and urging said valve member towards said seat, said end wall serving to retain said ball valve member and said coil spring in said valve casing section, said fitting, said end wall, said ball valve member and said coil spring forming a self-contained unit mountable as such with respect to said sight tube, and a valve unseating column means extending through said tube in floating relationship to said valve member and bearing at one end against said valve member to hold said valve member away from its seat against the action of said coil spring and bearing at the other end against an abutment, said column means being held in valve opening position by said tube while said tube is intact and being operable automatically upon breakage of said tube to release said valve member for closing movement under the action of said coil spring, and means for attaching said fitting to a vessel connection including a screw member having an attaching thread coaxial with said sight tube.

2. In a liquid level gauge of the atmospheric type, the combination comprising a sight tube having a closure at one end, and an automatic safety valve device secured to the other end of said tube for controlling communication with the interior of said tube through said other end, said device comprising a valve seat, a ball valve member movable towards and away from said valve seat, and a spring urging said ball valve member towards said seat, a rod extending through said tube and having one end bearing against said closure and the other end crowding said ball valve member off its seat in open position against the action of said coil spring, said rod being free from fixed attachment to said ball valve member and to said tube closure, said tube closure being internally bevelled to form a recess tapering towards its outer end to center said rod with respect to said tube at the end where it engages said closure, and means for attaching said fitting to a vessel connection including a screw member having an attaching thread coaxial with said sight tube.

3. In a liquid level gauge of the atmospheric type, the combination comprising a sight tube having a valveless closure at one end, and an automatic safety valve device secured to the other end of said tube for controlling communication with the interior of said tube through said other end and forming a self-contained unit with said tube, said device comprising a unitary fitting having at one end a cup section sealably receiving one end of said sight tube, and having at its other end a tubular valve casing section coaxial with said cup section and externally threaded coaxially with respect to said sight tube for screw attachment to a valve connection, said fitting having a transverse wall between its sections integral with said sections and apertured to form a valve passage, said transverse wall defining a seat on its valve casing side around said valve passage, means forming an outer transverse apertured end wall for said valve casing section, a ball valve member in said casing section, a coil spring in said casing section bearing against said outer end wall and urging said valve member towards said seat, said end wall serving to retain said ball valve member and said coil spring in said valve casing section, said fitting, said end wall, said ball valve member and said coil spring forming a self-contained unit mountable as such with respect to said sight tube, and a rod extending through said tube and having one end bearing against said closure and the other end crowding said ball valve member off it seat in open position against the action of said coil spring, said rod having floating engagement free from attachment at both ends with said closure and said ball valve member respectively.

PERCIVAL H. BISCOE.

REFERENCES CITED

The following references are of record in the file of this patent:

UNITED STATES PATENTS

| Number | Name | Date |
| --- | --- | --- |
| 37,292 | Hise | Jan. 6, 1863 |
| 368,197 | Drummond | Aug. 16, 1887 |
| 1,047,863 | Wall | Dec. 17, 1912 |
| 1,224,752 | Kirkwood | May 1, 1917 |
| 1,839,413 | Sage | Jan. 5, 1932 |

FOREIGN PATENTS

| Number | Country | Date |
| --- | --- | --- |
| 3,581 | Great Britain | Mar. 8, 1888 |
| 12,715 | Great Britain | June 30, 1894 |
| 292,001 | Germany | Mar. 4, 1914 |